United States Patent [19]

Stanhope et al.

[11] Patent Number: 5,125,940
[45] Date of Patent: Jun. 30, 1992

[54] IN-LINE AIR FILTER APPARATUS

[75] Inventors: Kent C. Stanhope, Lawrenceville; Paul E. Simms, West Salem, both of Ill.

[73] Assignee: Champion Laboratories, Inc., West Salem, Ill.

[21] Appl. No.: 657,662

[22] Filed: Feb. 19, 1991

[51] Int. Cl.⁵ .............................................. B01D 46/00
[52] U.S. Cl. ...................................... 55/385.3; 55/276; 55/498; 55/505; 123/198 E
[58] Field of Search ................... 55/498, 276, 510, 503, 55/505, 385.3; 123/198 E

[56]     References Cited
       U.S. PATENT DOCUMENTS

| | | | |
|---|---|---|---|
| 2,421,776 | 6/1947 | Dollinger | 55/502 |
| 3,038,211 | 6/1962 | Luedi | 55/510 |
| 4,036,616 | 7/1977 | Byrns | 55/498 |
| 4,157,902 | 6/1979 | Tokar | 55/505 |
| 4,941,900 | 7/1990 | Cordes | 55/498 |

Primary Examiner—Bernard Nozick
Attorney, Agent, or Firm—Allegretti & Witcoff, Ltd.

[57] ABSTRACT

The improved in-line air filter apparatus of the present invention includes an air filter housing disposed in-line on the engine air intake hose of an internal combustion engine, with a tubular air filter element longitudinally disposed therein and having a closed axial end of such tubular air filter element disposed upstream of an open axial downstream end, with the open tubular end having a size and shape substantially congruent with the size and shape of the engine air intake hose of the internal combustion engine for minimizing the turbulence of the filtered air supplied thereto, and with the closed upstream tubular end having an annular shaped air inlet portion surrounding such closed upstream tubular end for directing air longitudinally and inwardly through the body of the tubular air filter element.

20 Claims, 2 Drawing Sheets

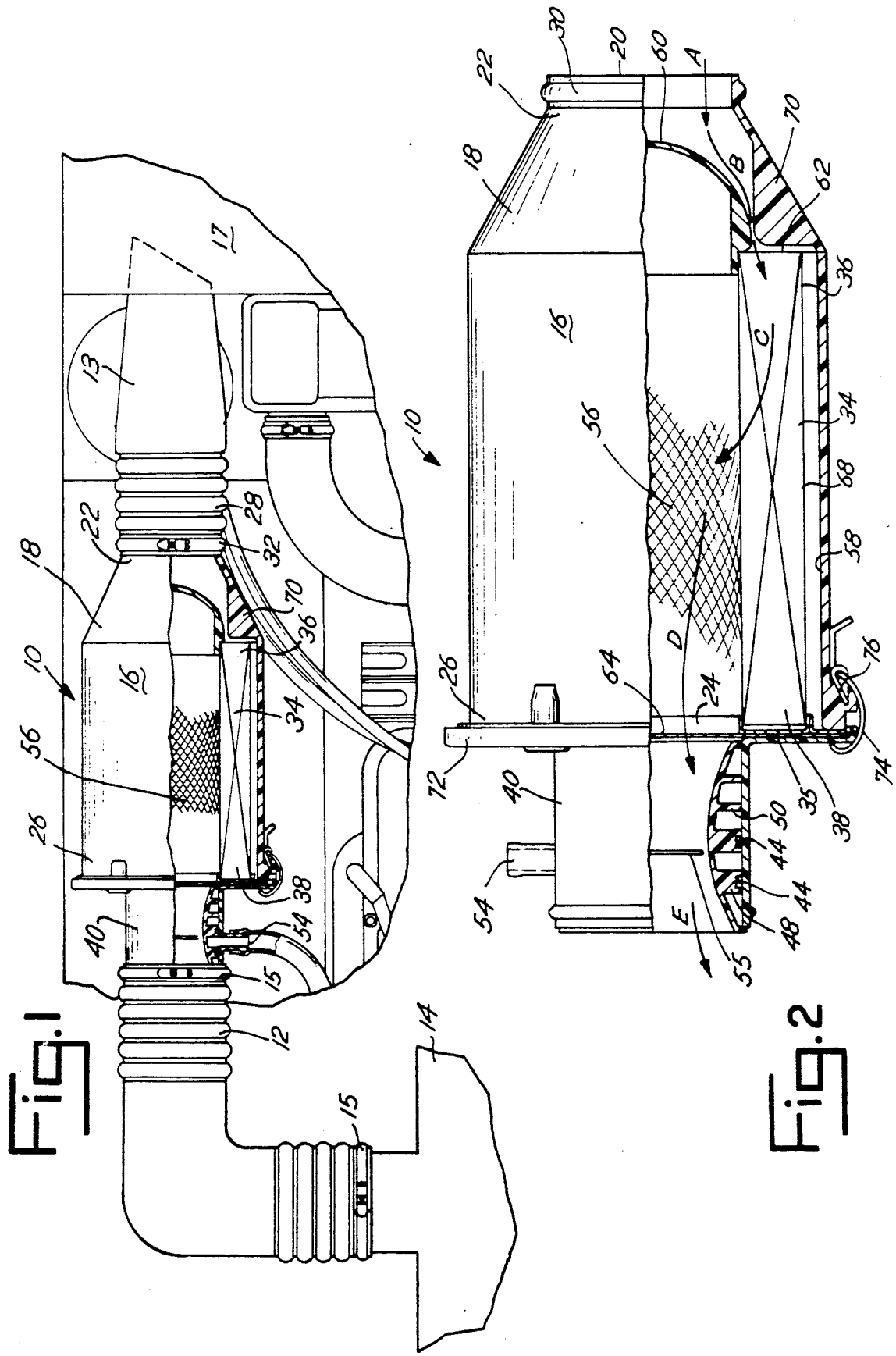

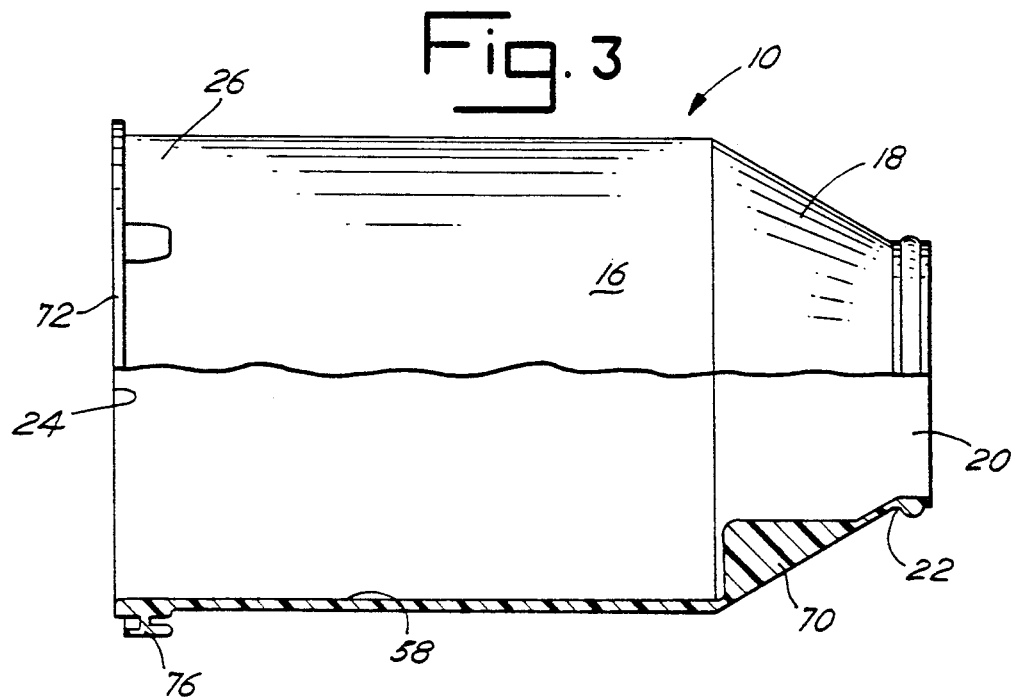
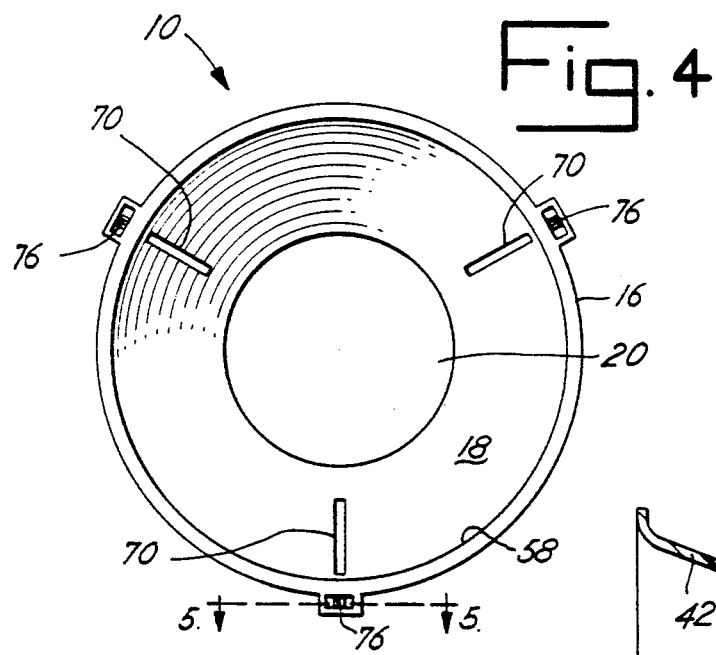
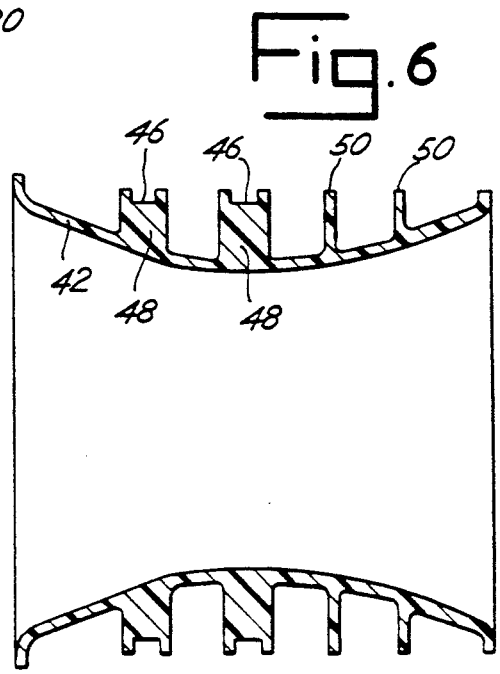
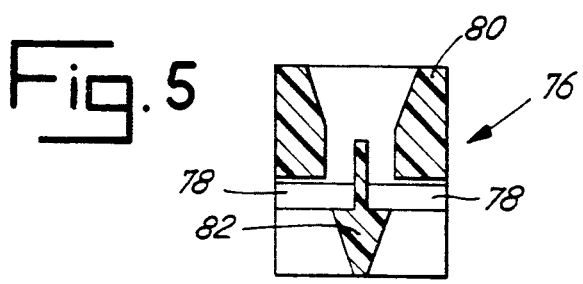

IN-LINE AIR FILTER APPARATUS

BACKGROUND OF THE INVENTION

The present invention is directed generally to air filters, and more particularly to an improved in-line air filter apparatus for providing filtered air having reduced turbulence to the engine air intake hose of an internal combustion engine and thereby reducing the pressure drop across the air filter apparatus.

In the prior art, the presently available air filter devices for use on internal combustion engines (for example, as used in motor vehicles) have had at least two substantial deficiencies: (1) high noise levels generated by the flow of air, and (2) high pressure drop across the entire air filter device. Both these characteristics have been found to be attributable to highly turbulent air flow conditions caused by air flow directional changes and abrupt internal wall configuration changes within the air filter device.

Intake air noise reduction is a substantial concern to automotive engineers because any additional air noise present adds a further component of noise to the noise level already emanating from the hood of the automobile from other elements of the engine, and is thus audibly further detectable by the occupants of the passenger compartment. Pressure drop across the air filter intake system is also a primary concern of automotive engineers, due to the inversely proportional relationship between the air flow restriction and the efficiency of the engine. As the air flow restriction increases in the air induction system, the horsepower and fuel economy of the engine are commensurately decreased.

Accordingly, it is a principal object of the improved in-line air filter apparatus of the present invention to alleviate materially these difficulties, defects, deficiencies of the prior art. In further particular, it is also a material object of the improved in-line air filter apparatus of the present invention to provide novel structure for supplying filtered air to the engine air intake hose of an internal combustion engine, in which novel structure the air stream during filtration is of reduced turbulence and which results in reduced pressure drop across the air filter apparatus.

SUMMARY OF THE INVENTION

In general terms, the improved in-line air filter apparatus of the present invention presents the advantage of providing less turbulent air by means of substantially improved air flow conditions. For example, a smooth transition from the smaller ambient air hose diameter to the larger housing diameter, a hemispherical end closure cap, and a filter element outlet having a diameter equal to the diameter of the engine air intake hose (as described more completely, infra), all serve to minimize turbulence, and hence air flow restriction. Yet additionally, the in-line construction of the air filter apparatus of the present invention permits the apparatus to be mounted co-axially with the air induction hose which further avoids drastic changes in the direction of air flow. The result is a more quiet and more efficient operation of the engine.

More particularly, the present invention includes in one preferred embodiment a substantially cylindrical air filter housing disposed in-line on the engine air intake hose of an internal combustion engine, with a tubular air filter element longitudinally disposed therein. The tubular shape of the air filter permits the air stream to be directed through the body of the tubular filter element and into the air intake hose by blocking one end of the tubular air filter element, and retaining the opposite end in open configuration. Thus, such tubular air filter element has a closed axial end disposed upstream of an open axial downstream end, with the open end having a size and shape substantially congruent with the size and shape of the engine air intake hose of the internal combustion engine for minimizing the turbulence of the filtered air supplied thereto. The closed upstream end of the tubular air filter element has an annular shaped air inlet portion for directing air longitudinally and inwardly through the walls of the body of the tubular air filter element.

These and other features of the improved in-line air filter apparatus of the present invention will become apparent to those skilled in the art upon review of the following description of a presently preferred embodiment, the appended claims, and the accompanying drawing.

BRIEF DESCRIPTION OF THE DRAWING

The accompanying drawing sets forth, presently preferred embodiments of the present invention, wherein various elements in the different views are identified by like numerals and wherein:

FIG. 1 is a side elevational view of the improved in-line air filter apparatus of the present invention as installed on the engine intake hose of an internal combustion engine and showing the air filter housing thereof partially sectioned away to reveal the tubular air filter element and accompanying elements disposed within the interior of such housing;

FIG. 2 is an enlarged view of the improved in-line air filter apparatus as shown in FIG. 1, and as likewise partially sectioned, with the top longitudinal half of the drawing showing the exterior of the air filter housing, and the bottom longitudinal half of the drawing comprising a longitudinal cross-sectional view to show the details of the tubular air filter element including the filtration medium support, the filtration medium (schematically shown), and the air filtration element positioning, centering, and support means, along with the there depicted hemispherical end cap to close the closed end of the tubular air filter element in order to direct the flow of air therearound for further directing such air to flow inwardly through the body of the tubular filter medium into the lumen thereof, for thereupon exiting at the open end of the filter into the engine air intake hose, and which in the embodiment of FIG. 2 further includes a venturi apparatus;

FIG. 3 is a partially sectioned view of an embodiment of the improved in-line air filter apparatus of the present invention there showing a cylindrical air filter housing, and further showing at the bottom longitudinal half thereof the spring-loaded clip bracket disposed at and securing the downstream end of the air filter housing, and also showing the air filter element positioning means in the form of one of a plurality of triangular-shaped ribs disposed each in projecting array from the interior surface of the housing for holding, supporting and positioning the hemispherical end closure cap;

FIG. 4 is an end on view of the embodiment of FIG. 3 (slightly reduced in size) as viewed from the downstream (and there, open) end of the air filter housing, and showing an embodiment having three such air filter element centering projecting ribs as disposed on the interior surface of the frusto-conical portion of the air filter housing, and also showing on the exterior of the housing the brackets for holding the spring loaded clamps;

FIG. 5 is a greatly enlarged cross-sectional view of one bracket taken along line 5—5 of FIG. 4; and FIG. 6 is an enlarged longitudinal cross-sectional view of the venturi apparatus as shown in FIGS. 1 and 2, and in addition showing radially disposed O-ring holding brackets for sealingly mounting the venturi within the housing.

DETAILED DESCRIPTION OF PREFERRED EMBODIMENT

The improved in-line air filter apparatus of the present invention is directed to structures comprising various forms of an air filter apparatus which function to reduce the pressure drop across the entire air filter apparatus, and also which function to provide filtered air having reduced turbulence to the engine air intake hose of an internal combustion engine, such as may be used in a motor vehicle. The air filter apparatus of the present invention includes an air filter housing, which may be substantially cylindrical, but which may include a frusto-conical element thereof, or alternatively may be slightly tapered in overall shape. The air filter housing element of the present invention has an ambient air intake end at one end thereof and a filtered air outlet at the opposite end thereof. Most importantly, the air filter housing is adapted for connection to and disposition in-line on the engine air intake housing of the internal combustion engine.

A tubular air filter element is longitudinally disposed and enclosed within the preferably elongated air filter housing. The tubular air filter element has one closed axial end and an oppositely disposed axial end. The closed axial end is disposed upstream of the open axial downstream end. The open end has a size and shape which is substantially congruent with the size and shape of the engine air intake hose of the internal combustion engine. This feature of the improved in-line air filter apparatus of the present invention functions to minimize the turbulence of the filtered air which is supplied to such internal combustion engine.

The improved in-line air filter apparatus of the present invention also includes filtration media support means, which may be in the form of a mesh or an expanded metal screen. The filtration media support means is disposed within the housing and adjacent the interior walls of the housing for flow of air therethrough and through the body of the tubular air filter element supported therefrom.

The tubular air filter element of the in-line air filter apparatus of the present invention has associated therewith an end closure which is disposed at and closes the closed end of the air filter element to define an ambient air intake end of the filter element which is substantially annular in shape in end-on view. The air filtration media support means in preferred embodiments also further defines at the open end of the tubular air filter element a filtered air output end of such tubular air filtration element which is substantially circular in shape in end-on view. In these and other preferred embodiments, the tubular shape of the body of filtration medium together with the end closure cap co-operate to define a longitudinally and inwardly directed air flow path from the closed end to the open end of the tubular air filter element to direct the stream of air into, within and from the tubular air filter element as disposed within the housing.

The air filtration media support means is in preferred embodiments substantially cylindrical in shape and is disposed congruently with the preferably similarly shaped air filter housing. The diameter of such preferably cylindrical filtration medium support means may preferably be substantially the same diameter as that of the engine air intake hose, and such air filtration support means is disposed within the air filter housing to direct air smoothly and with minimum turbulence into the engine air intake hose.

The filtration medium support means also preferably defines an air flow channel means disposed internally of the air filtration medium, and thus directs the filtered air to and into the engine air intake hose.

The body of the tubular air filter element may comprise in a preferred embodiment a corrugated paper filter element which is cylindrical in overall shape. Such corrugated paper element preferably may have an exterior shape which fits snugly within the air filter housing.

The end closure cap disposed at the upstream end of the tubular filter element may preferably be dome-shaped in order to present a substantially hemispherical shape to the flow of air into the ambient air intake of the air filter housing to minimize the restriction of air entering the ambient air end (i.e., the upstream end) and to deflect the entering ambient air efficiently around and past the dome-shaped end closure cap.

The air filter housing may also further include air filter element axial positioning means for positioning the longitudinal axis of the air filter element to coincide preferably with the longitudinal axis of the air filter housing. Such air filter element axial positioning means may include in preferred embodiments a plurality of air filter positioning projections attached to and projecting inwardly from the interior surface of the air filter housing, and in certain preferred embodiments from the frusto-conical portion thereof, and more preferably engaging the dome-shaped end cap for the closed, upstream end of the tubular air filter element. Such air filter positioning projections may be essentially triangular in longitudinal cross-sectional shape.

The air filter housing may further include a housing end lid for closing the portion of the downstream end of the air filter housing which is disposed concentrically around the downstream and air exiting end thereof in order to direct the stream of filtered air into the engine air intake hose.

Referring now to the drawing and to FIG. 1 in particular, the improved in-line air filter apparatus of the present invention generally 10 is connected to the air intake hose 12 of an internal combustion engine 14 (partially shown) by means of clamps 15, and such air filter apparatus 10 is connected at the opposite end thereof to an ambient air intake 13 disposed at the front of the engine compartment 17, shown in partial section in FIG. 1. Air filter apparatus 10 includes an air filter housing 16, which may be substantially cylindrical as shown in FIGS. 1-4 hereof, and includes a frusto-conical forward element 18, although other housing shapes including a slightly tapered shape are contemplated. Air filter housing element 16 has an ambient air intake 20 at the upstream end 22 thereof and a filtered air outlet 24 at the downstream end 26 thereof. Ambient air intake 20 is shown in FIG. 1 connected to ambient air intake hose 28 by means of a radial bead 30 and clamp 32 thereover.

A tubular air filter schematically shown at 34 is longitudinally disposed and enclosed within the elongated air filter housing 16. Such tubular air filter 34 has one closed axial end 36 which is disposed upstream of an open axial downstream end 38. Open downstream end 38 has a size and shape which is substantially congruent with the size and shape of engine air intake hose 12 of internal combustion engine 14 and functions to minimize the turbulence of the filtered air which is supplied to such internal combustion engine.

A venturi extension housing 40 is disposed between open axial downstream end 38 and engine air intake hose 12, as shown in FIGS. 1 and 2. Such venturi extension housing 40 contains a venturi element 42 which is sealingly disposed therein by means of O-rings 44,44 disposed within O-ring support grooves 46 disposed radially upon O-ring support ribs 48. Stabilization ribs 50 are disposed radially around the exterior 52 of venturi element 42 for providing stabilization thereto. Venturi element 42 may or may not be used in alternative embodiments depending upon the need for crankcase vapor evacuation, and when present evacuates by means of a vacuum evacuation tube 54 for the PCV valve (not shown), and disposed on venturi extension housing 40 and through evacuation slits 55 in the wall of venturi element 40, in a manner known to those of ordinary skill in the art. Although venturi extension housing 40 is dipicted as being essentially cylindrical, it may be slightly tapered in shape in certain alternative preferred embodiments.

Improved in-line air filter apparatus 10 also includes filtration media support means, which may be in the form of a filter support mesh 56. Filter support mesh 56 is disposed within housing 16, and more particularly adjacent the interior walls 58 of housing 16 for flow of air therethrough and through the tubular air filter 34 supported therefrom.

Tubular air filter 34 includes an end closure cap 60 which is disposed at and closes closed end 22 of air filter 34 to define an ambient air intake end 62 of air filter 34 which is substantially annular in shape in end-on view. Filter support mesh 56 also further defines at open end 24 of tubular air filter 34 a filtered air output end 64 of such tubular air filter 34 which is substantially circular in shape in end-on view. Hence, tubular air filter 34 and the end closure cap 60 together function to define a longitudinally and inwardly directed air flow path shown in Arrows A-E on FIG. 2. In particular, ambient air enters ambient air intake 20 (at Arrow A) and is deflected around end closure cap 60 (at Arrow B) to the ambient air intake end 62 of air filter 34; then such air stream passes through the body 66 of air filter 34 through support mesh 56 thereof into the lumen of such tubular air filter (at Arrow C); whereupon, the now filtered air stream passes from the air filter 34 through downstream end 26 thereof, into venturi element 42 (at Arrow D) and therefrom into the engine air intake hose 12 (at Arrow E).

Tubular air filter 34 may comprise in preferred embodiments a corrugated paper filter element which is cylindrical in overall shape as shown in FIGS. 1 and 2. Such corrugated paper element preferably may have an exterior surface 68 which fits snugly within air filter interior walls 58.

Air filter housing 16 includes means for the purpose of axial positioning of the longitudinal axis of air filter 34 to coincide, as shown, with the longitudinal axis of air filter housing 16. Such air filter element axial positioning means is shown in FIGS. 1, 2, 3 and 4 as comprising a plurality of air filter positioning projections 70 attached to and projecting inwardly from frusto-conical portion 18 of interior walls 58 of air filter housing 16, and engages end closure cap 60 for the closed, upstream end 22 of tubular air filter 34.

Air filter housing 16 also includes a housing end lid 72 for closing the portion of downstream end 24 of air filter housing 16 which is disposed concentrically around the downstream and air exiting end 24 thereof in order to direct the stream of filtered air into engine air intake hose 12 (see Arrows D and E). Housing end lid 72 is shown as contiguous with venturi extension housing 40 in FIG. 2, but of course may be separately formed. Axial downstream end 38 of air filter 34 is supported by a support bracket 35 which has an annular-shaped groove therein to accommodate and support such downstream end 38 of air filter 34, the upstream end 36 of which is supported by means of projections 70.

Clips 74 which are spring-loaded by means of springs 76 are disposed to secure housing end lid 72 upon downstream end 26 thereof. Clips 74 are supported by clip support brackets 76, as shown in FIG. 2 in particular. Each clip support bracket 76 has two side channels 78,78 for engagement of the ends of the springs 76 and front and rear support engagement surfaces 80,82. The clip support brackets 76 may vary widely in structure, as is well known in the art.

The various elements of the present invention may be made of various different materials. For example, injection molded plastic is preferred for the various components comprising the housing element 16 thereof. End enclosure cap 60, shown as a done-shaped structure in FIGS. 1 and 2, may likewise be made of molded plastic. The filtration medium support mesh 56 is preferably formed of a metal mesh or screen-like material. The filter medium material 34, per se, is preferably made of a fibrous material of appropriate porosity, and most preferably of filter paper.

The advantages which flow from the utlization of the improved in-line air filter apparatus 10 of the present invention are considerable, and are demonstrated materially as set forth in the following Example.

EXAMPLE

In the present example hereof, the pressure drop across the structure of the improved in-line air filtration apparatus 10 of the present invention was tested versus the pressure drop experienced with the presently used Chrysler XJ Panel air filter housing. The Chrysler XJ Panel air filter housing is reasonably typical of the housings presently utilized in regard to automotive and other internal combustion engines in the art. Such prior art housings are designed, for the most part, to fit into the available space near the fender walls of the automobile, and consequently away from the engine. This remote location causes multiple air flow direction changes in piping the ambient air from the vehicle front through the air cleaner assembly to the throttle body. These directional changes result in turbulent flow conditions which contributed to increased pressure drop and/or noise level. The prior art Chrysler apparatus includes an air filter housing which is substantially box-shaped. The lower half portion of the box is separated from the upper half portion of the box by the filter medium. Ambient air typically enters the lower portion of the box-shaped housing longitudinally at one end thereof, and is then deflected and directed upwardly through the filter element. Upon being filtered, the upwardly flowing air from the lower portion of the box is further deflected from the top of the interior surface of the box and is finally exhausted laterally from the box in a direction which is substantially transverse to that of the initial ambient air entry into the lower portion of the box. Based thereon, such air flow in the prior art Chrysler apparatus abruptly enters, is deflected several times interiorly, and finally exits the filtration apparatus, all of which creates turbulent air flow conditions, which in turn contribute to increased pressure drop and increased noise level. Such abrupt entries, deflections and exits of the air flow are caused by the substantially flat surfaces of the boxed-shaped housing of the prior art Chrysler apparatus. In addition to the abruptness of the air exit and entry, the flat surfaces of the prior art Chrysler apparatus increase noise levels when expanding and contracting during pressure pulsations, such pressure pulsations being caused by variations in engine air demand.

The respective pressure drops were measured in comparing the air filter apparatus of the present invention with the Chrysler prior art apparatus noted above, and with the following results:

| Air Flow (scf m) | Pressure Drop (in. H$_2$O) Apparatus Hereof | Chrysler XJ |
| --- | --- | --- |
| 100 | 1.6 | 1.8 |
| 200 | 6.3 | 6.6 |
| 300 | 12.6 | 14.3 |
| 330 | 15.4 | 17.3 |
| 400 | 22.9 | 25.7 |

The basic and novel characteristics of the improved apparatus of the present invention will be readily understood from the foregoing disclosure by those skilled in the art. It will become readily apparent that various changes and modifications may be made in the form, construction and arrangement of the improved apparatus of the present invention, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. In an internal combustion engine disposed within an engine compartment of a motor vehicle, said engine having an engine air intake hose, the improvement comprising an in-line air filter apparatus for providing filtered air having reduced pressure drop across the filter and reduced turbulence to said engine air intake hose of said internal combustion engine, said improved air filter apparatus comprising:

an ambient air intake disposed at the front of and within said engine compartment of said motor vehicle having said internal combustion engine;

an air filter housing having an ambient air intake end at a front end thereof, attached to said ambient air intake and disposed within said engine compartment of said motor vehicle and a filtered air outlet end of the opposite, rear end thereof, and a medial housing portion disposed therebetween, said air filter housing having a conduit means disposed from said rear end thereof for connecting to said air intake hose, said air filter disposed in-line on the engine air intake hose of the internal combustion engine; and a tubular air filter element longitudinally disposed and enclosed within said air filter housing for passage of ambient air to be filtered therethrough, said air filter housing medial portion and said tubular air filter element defining an elongated tubular shaped ambient air passage space therebetween, said ambient air passage space having a substantially uniform transverse cross-sectional shape from the front end thereof to the rear end thereof, said air filter element having one closed axial end and an oppositely disposed open axial end, said closed axial end disposed upstream of said open axial downstream end, said open axial end communicating with said outlet end of said housing, said open end having a size and shape substantially congruent with the size and shape of the engine air intake hose of the internal combustion engine for minimizing the turbulence of the filtered air supplied thereto.

2. The improved air filter apparatus of claim 1 wherein said tubular air filter element comprises a fibrous air filtration medium and filtration medium support means for supporting said air filtration medium within said housing and adjacent the interior walls thereof for flow of ambient air therethrough.

3. The improved air filter apparatus of claim 2 wherein said filtration medium support means further defines at the open end of said tubular air filter element a filtered air output end of said tubular air filter element which is substantially circular in shape in end-on-view.

4. The improved air filter apparatus of claim 2 wherein said filtration medium support means defines an air flow channel means disposed interiorly of said air filtration medium for receiving filtered air from said air filtration medium and directing said filtered air to the engine air intake hose.

5. The improved air filter apparatus of claim 2 wherein said air filtration medium support means is substantially cylindrical in shape and is disposed congruently within said air filter housing.

6. The improved air filter apparatus of claim 5 wherein the diameter of said cylindrical air filtration medium support means is substantially the same as the diameter of the engine air intake hose, and said air filtration medium support means is disposed within said air filter housing to direct air smoothly and with minor turbulence into the engine air intake hose.

7. The improved air filter apparatus of claim 2 wherein said filtration medium support means comprises a screen.

8. The improved air filter apparatus of claim 7 wherein said screen comprises expanded metal.

9. The improved air filter apparatus of claim 2 further comprising an air filter element end closure cap disposed at and closing the upstream end of said tubular air filter element to define an ambient air intake end of said tubular air filter element which is substantially annular in shape in end-on view.

10. The improved air filter apparatus of claim 9 wherein said filtration medium and said end closure cap define a longitudinally and inwardly directed air flow path from said closed end to said open end, said air flow path flowing into, within and from said tubular air filter element disposed with said housing.

11. The improved air filter apparatus of claim 9 wherein said air filter housing includes a housing end lid for disposition upon said downstream end of said air filter housing.

12. The improved air filter apparatus of claim 9 wherein said end closure cap is dome-shaped to deflect the entering ambient air efficiently around and past said dome-shaped end closure caps into said ambient air intake end of said tubular air filter element.

13. The improved air filter apparatus of claim 12 wherein said dome-shaped end closure cap is hemispherical in shape.

14. The improved air filter apparatus of claim 1 wherein said fibrous air filtration medium comprises a corrugated paper filter element.

15. The improved air filter apparatus of claim 14 wherein said corrugated paper filter element has an exterior shape to fit snugly within said air filter housing.

16. The improved air filter apparatus of claim 15 wherein said corrugated paper filter element is cylindrical in shape.

17. The improved air filter apparatus of claim 1 further comprising air filter element axial positioning means for positioning the longitudinal axis of said air filter element within said air filter housing.

18. The improved air filter apparatus of claim 17 wherein said air filter element axial positioning means comprises annular channel means disposed at the downstream end of said air filter housing for engagement with said downstream end of said air filter element to provide support thereto within said housing.

19. The improved air filter apparatus of claim 17 wherein said air filter element axial positioning means further includes means for positioning said longitudinal axis of said air filter element.

20. The improved air filter apparatus of claim 19 wherein said air filter element axial positioning means includes a plurality of air filter positioning projections attached to and projecting inwardly from the interior surface of said air filter housing for support of said upstream end of said air filter element.

* * * * *